(12) United States Patent     (10) Patent No.: US 8,213,054 B2
Suzuki     (45) Date of Patent: Jul. 3, 2012

(54) IMAGE PROCESSING APPARATUS, ERROR DIFFUSION PROCESSING METHOD, AND PROGRAM

(75) Inventor: Michiyuki Suzuki, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 939 days.

(21) Appl. No.: 11/731,070

(22) Filed: Mar. 30, 2007

(65) Prior Publication Data

US 2007/0229907 A1    Oct. 4, 2007

(30) Foreign Application Priority Data

Apr. 3, 2006 (JP) ................. 2006-102540

(51) Int. Cl.
*G06K 15/00* (2006.01)
(52) U.S. Cl. ............ 358/3.03; 358/3.05; 358/3.04; 345/616
(58) Field of Classification Search ........... 358/3.03, 358/3.05, 501, 3.04; 382/173; 345/616
See application file for complete search history.

(56) References Cited

U.S. PATENT DOCUMENTS

| 5,467,201 | A | * | 11/1995 | Fan ............... 358/447 |
| 5,515,456 | A | * | 5/1996 | Ballard ............. 382/252 |
| 5,553,165 | A | * | 9/1996 | Webb et al. ........ 382/252 |
| 5,604,605 | A | * | 2/1997 | Moolenaar ......... 358/3.03 |
| 5,627,659 | A | * | 5/1997 | Kakutani .......... 358/443 |
| 5,701,135 | A | | 12/1997 | Aratani et al. |
| 6,963,412 | B1 | * | 11/2005 | Toda ............ 358/1.13 |
| 7,057,773 | B2 | * | 6/2006 | Ilbery ........... 358/3.05 |
| 7,436,550 | B2 | * | 10/2008 | Aoki et al. ........ 358/3.03 |
| 2003/0132940 | A1 | | 7/2003 | Yamagata et al. |
| 2004/0263910 | A1 | | 12/2004 | Chang et al. |
| 2006/0044584 | A1 | * | 3/2006 | Sobczak .......... 358/1.13 |

FOREIGN PATENT DOCUMENTS

| JP | 06-334847 | 12/1994 |
| JP | 11-058837 | 3/1999 |
| JP | 11-088684 | 3/1999 |
| JP | 2002-077612 | 3/2002 |
| JP | 2002077612 A * | 3/2002 |
| JP | 2002-237952 | 8/2002 |
| JP | 2003-208607 | 7/2003 |
| JP | 2005-020733 | 1/2005 |

* cited by examiner

*Primary Examiner* — King Poon
*Assistant Examiner* — Jamares Q Washington
(74) *Attorney, Agent, or Firm* — David G. Conlin; Steven M. Jensen; Edwards Wildman Palmer LLP (57) ABSTRACT

An image processing apparatus includes a dividing portion that divides input multivalue image data into a plurality of bands, an error diffusion process portion that carries out an error diffusion process on each divided band to quantize each pixel, and a controlling portion that controls the dividing portion and error diffusion process portion. The error diffusion process portion, following control by the controlling portion, operates in a first mode to repeat the error diffusion process not accompanying quantization given times on each noted pixel included in a given line of the each band (head line, etc.), and operates in a second mode to carry out the error diffusion process on the each band sequentially from the head line of the each band on the basis of an error value obtained in the first mode to put out quantized data.

6 Claims, 11 Drawing Sheets

| CONDITION | BINARY DATA | ERROR |
|---|---|---|
| 255 > DATA ≧ TH | 1 | DATA − 255 |
| TH > DATA > 0 | 0 | DATA − 0 |

|  |  | NOTED PIXEL | 10/64 | 5/64 |
|---|---|---|---|---|
| 4/64 | 7/64 | 10/64 | 7/64 | 4/64 |
| 2/64 | 4/64 | 5/64 | 4/64 | 2/64 |

FIG.11

|  |  | NOTED PIXEL | -20 | -10 |
|---|---|---|---|---|
| -8 | -14 | -20 | -14 | -8 |
| -4 | -8 | -10 | -8 | -4 |

FIG.12

|  |  | NEW NOTED PIXEL | | | | | |
|---|---|---|---|---|---|---|---|
|  |  | 255 | 109 | 119 | 129 | 129 | 129 |
| -8 | -14 | 109 | 115 | 121 | 129 | 129 | 129 |
| -4 | -8 | 119 | 121 | 125 | 129 | 129 | 129 |
|  |  | 129 | 129 | 129 | 129 | 129 | 129 |
|  |  | 129 | 129 | 129 | 129 | 129 | 129 |

FIG.13

IMAGE PROCESSING APPARATUS, ERROR DIFFUSION PROCESSING METHOD, AND PROGRAM

CROSS-NOTING PARAGRAPH

This Non-provisional application claims priority under 35 U.S.C. §119 (a) on Patent Application No. 2006-102540 filed in JAPAN on Apr. 3, 2006, the entire contents of which are hereby incorporated herein by reference.

FIELD OF THE INVENTION

The present invention relates generally to an image processing apparatus, an error diffusion processing method, and a program, and more particularly, to an image processing apparatus that carries out an error diffusion process band by band, an error diffusion processing method by the image processing apparatus, and a program for the error diffusion processing method.

BACKGROUND OF THE INVENTION

A conventional error diffusion method has been known. According to this method, when an original image is converted into an image having tones fewer than that of the original image, an error between the tone value of each pixel in the converted image and the tone value of each pixel in the original image is diffused into surrounding pixels. This error diffusion method enables the diffusion of the error resulting from tone conversion into surrounding pixels, thus reducing a thickness irregularity in the converted image.

The basic principle of the above error diffusion method will be described based on FIGS. 9 to 12. In the following case, a halftone image having 256 tones is converted into an image expressed by binarized tone value of 0 or 255. In an original image shown in FIG. 9, the thickness value of any noted pixel is compared with a given threshold to convert the noted pixel's thickness value into 0 or 255. A noted pixel is shifted sequentially in processing, starting from the pixel at the left upper corner, proceeds in a main scanning direction, and, after the completion of the process for one line, proceeds to the next line along a subscanning direction. The threshold mentioned here is 128, which is the middle of 256 tones.

Figure 9:
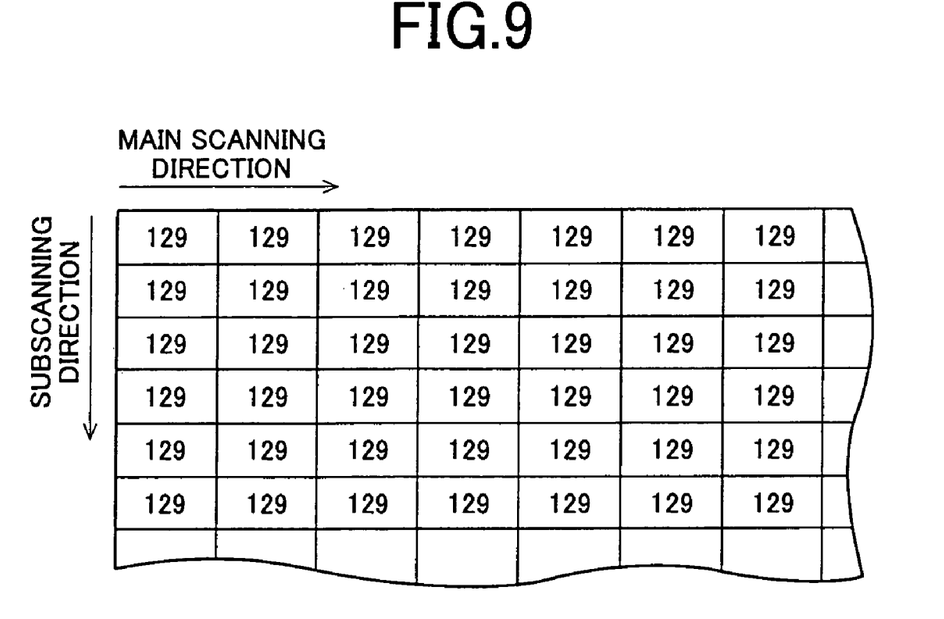
FIG. 9 depicts an example of tone values of an original image that is before undergoing an error diffusion process in binarization.

In the original image shown in FIG. 9, comparison between the thickness value 129 of the pixel at the left corner (noted pixel) and the threshold 128 demonstrates that the noted pixel's thickness value 129 is larger than the threshold 128, which causes the conversion of the noted pixel's thickness value into 255. This conversion of the noted pixel's thickness value from 129 into 255 produces an error (difference) of 255−129=126. The error is diffused into surrounding pixels on the basis of an error diffusion process table shown in FIG. 10. This example of error diffusion process table shows preset diffusion factors in a matrix form, and is used to allocate values given by multiplying the difference at the noted pixel by diffusion factors, to surrounding pixels.

Figure 10:
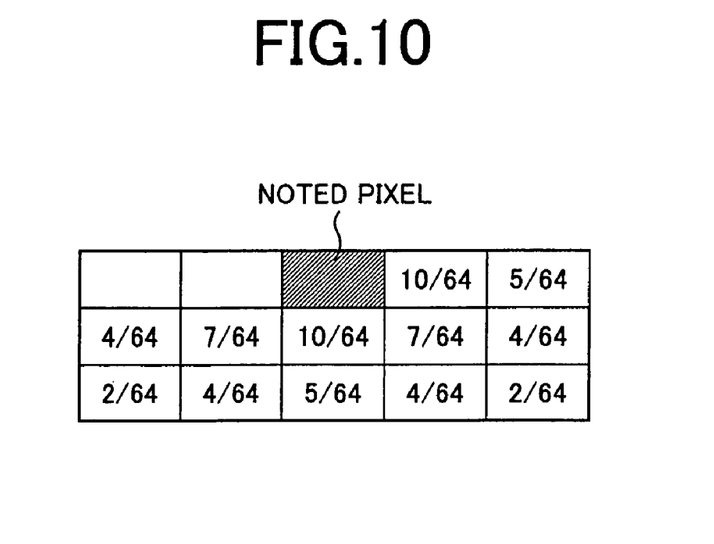
FIG. 10 depicts an example of the error diffusion process table used for the error diffusion process.

When a 5×3 matrix form is employed for the error diffusion process table, as shown in FIG. 10, a range of error scattering is a matrix of 5×3. The diffusion factors in the error diffusion process table are so set that the sum total of the diffusion factors becomes 1 to maintain image thickness before and after the error diffusion process.

In FIG. 10, an allocation value for the pixel next on the right to the noted pixel is: 126(difference of the noted pixel)×10/64(diffusion factor of the next pixel)≈20 (figure below a decimal point is rounded off or down). The mathematical sign of the allocation value becomes reverse to that of the difference of the noted pixel to maintain the overall thickness of the image, thus −20 is added to the pixel next on the right to the noted pixel.

Figure 11:
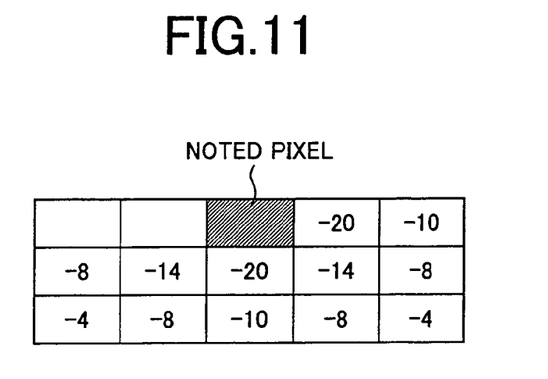
FIG. 11 depicts a result of calculation of diffusion errors at the first noted pixel in the original image in a case of the use of the error diffusion process table.

Calculating values to be allocated to surrounding pixels on the basis of the error diffusion process table in the above manner gives a result as shown in FIG. 11. Allocating the allocation values shown in FIG. 11 in the original image gives a result shown in FIG. 12.

Figure 12:
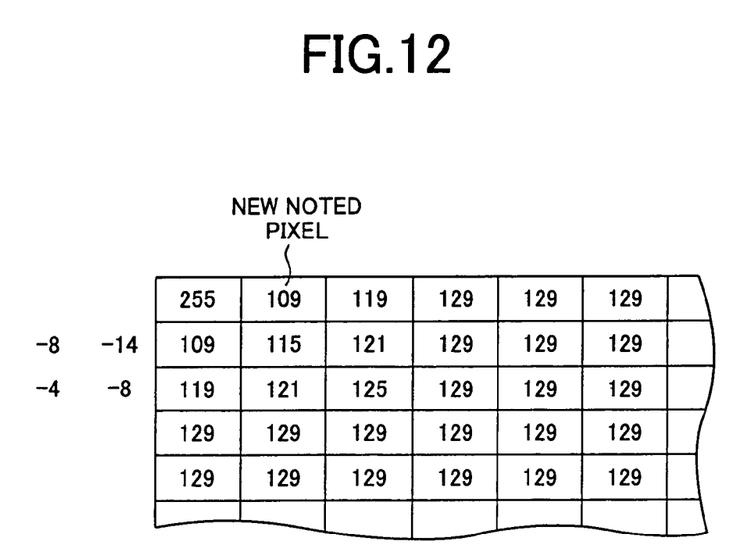
FIG. 12 depicts tone values that results after the diffusion errors are scattered in the original image.

Following the end of error diffusion on the first noted pixel, the pixel next on the right to the first noted pixel is taken to be a new noted pixel, which is subjected to error diffusion. The new noted pixel at this time has a thickness value 109, which is compared with the threshold 128. Subsequently, the same process as this process is carried out repeatedly. In this manner, error diffusion on every pixel is carried out as a noted pixel is shifted sequentially to convert the original image into an image having tones fewer than that of the original image.

Figure 13:
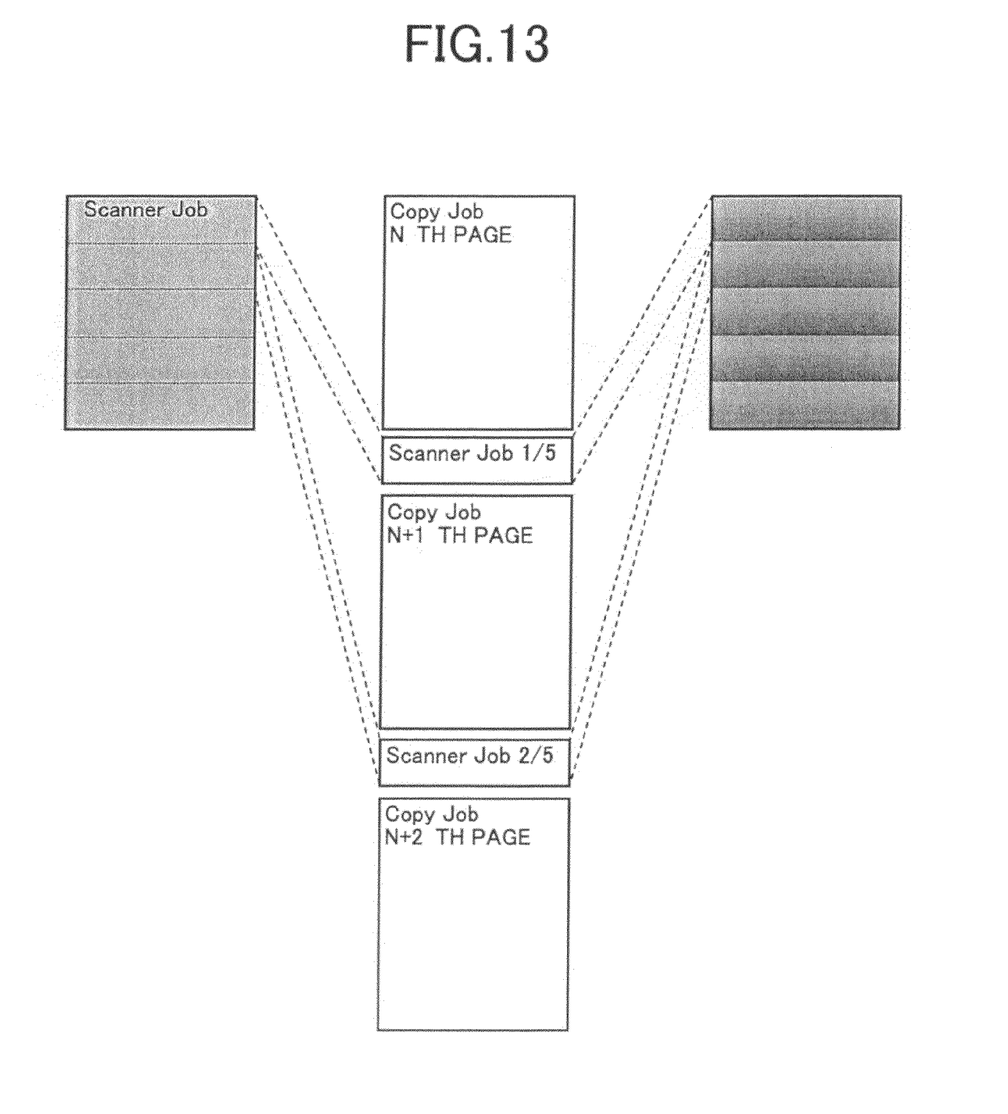
FIG. 13 an explanatory view of a trouble occurring at the boundary between bands.

When an error diffusion process on scanner data is carried out using a time between copy jobs, error diffusion on divided pieces of scanner data produces unnatural boundary lines between bands, as shown in FIG. 13. This is because that all accumulated error values including that on the last line just before the end of a band are cleared in carrying out error diffusion to make impossible the error diffusion for which thickness values including that on the last line are considered. An image having a thickness resulting in a larger error value, such as a halftone image, in particular, requires processing of a plurality of lines to achieve a proper error level.

A method for dealing with the above problem in processing different images through band changeover has been known. According to the method, error values stored in a line memory are evacuated to another large-capacity memory and the following band is processed. This method will be described based on a process flow shown in FIG. 14.

Figure 14:
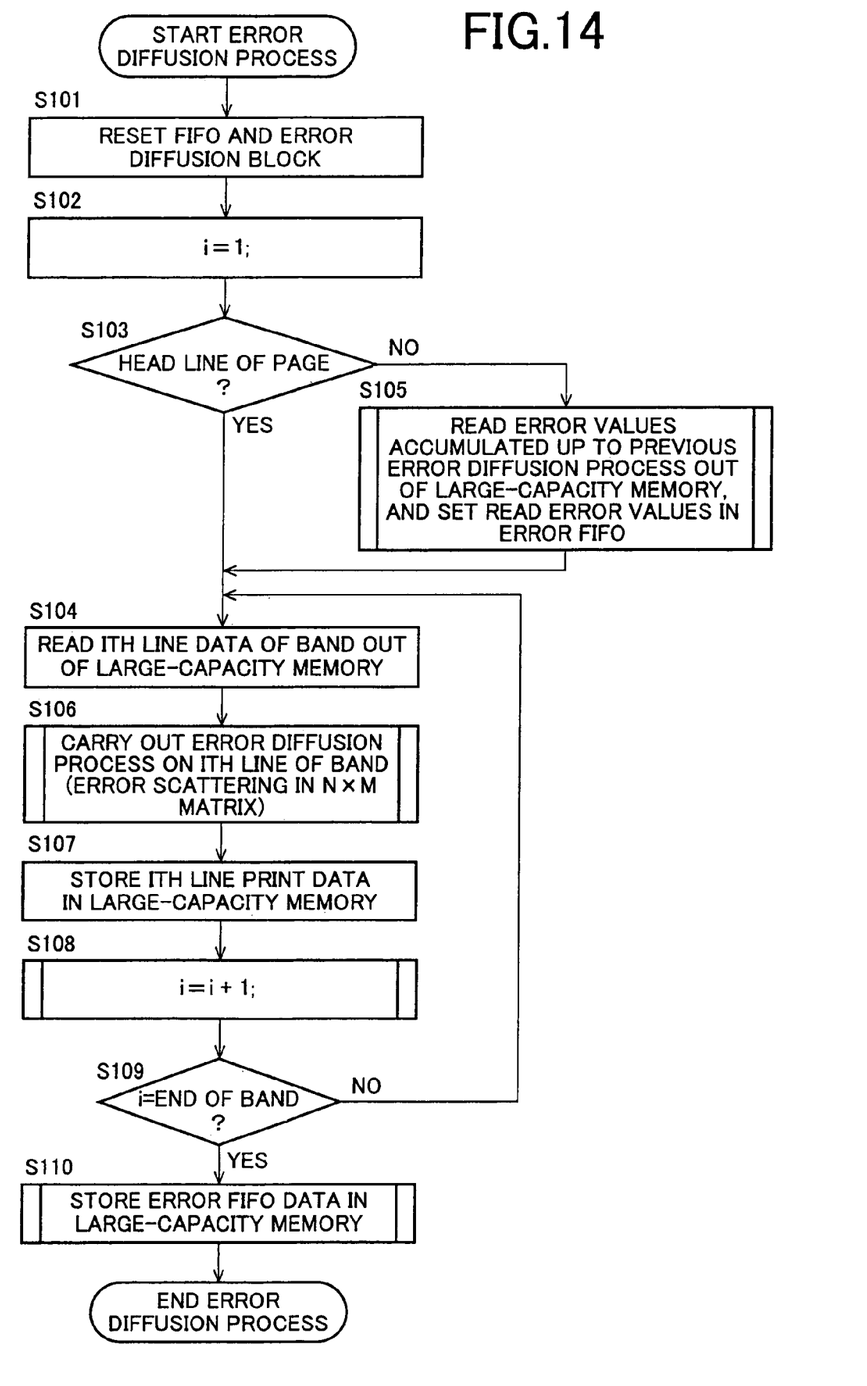
FIG. 14 is an explanatory flowchart of a conventional error diffusion processing method.

FIG. 14 is an explanatory flowchart of a conventional error diffusion processing method. An image processing apparatus first resets a FIFO (line memory) and an error diffusion block, in which error values are set (step S101), and sets a line number i=1 (step S102). The image processing apparatus then determines on whether a line to be processed is the head line on a page (step S103), and, when the line is the head line on the page (YES at step S103), reads ith line data of a band out of a large-capacity memory (step S104). When the line is not the head line on the page (NO at step S103), the image processing apparatus reads error values accumulated up to the previous error diffusion process out of the large-capacity memory, sets the read error values in the FIFO, and proceeds to step S104 (step S105).

The image processing apparatus then carries out the error diffusion process on the ith line of the band using the ith line data read out at step S104 (step S106), stores ith line print data in the large-capacity memory (step S107), sets i=i+1, and proceeds to the error diffusion process on the next line (step S108).

Subsequently, the image processing apparatus determines on whether the ith line is the end of the band (step S109). When the ith line is the end of the band (YES at step S109), the image processing apparatus stores error values set in the FIFO into the large-capacity memory (step S110). When the ith line is not the end of the band (No at step S109), the image processing apparatus returns to step S104 to repeat the same process.

According to the conventional method, the image processing apparatus reads error values accumulated up to the previous error diffusion process out of the large-capacity memory, sets the read error values in the FIFO, and then starts another error diffusion process. The method requires the image processing apparatus to transfer error values in the FIFO into the large-capacity memory at the end of the band. The image processing apparatus, therefore, must be provided with a controller for reading and writing error values, which is designed as a hardware circuit, thus increases a circuit scale in the image processing apparatus.

In contrast, for example, Japanese Laid-Open Patent Publication No. 2002-237952 suggests a method of using an error buffer to put each pair of adjacent bands in a mutual dependent relation through the error buffer in eliminating the unnaturalness of an image at a band boundary and rendering divided PDL (Page Description Language) data to a subpage consisting of a plurality of bands.

Japanese Laid-Open Patent Publication No. 2005-020733 suggests a method of allowing a pixel at a block boundary to receive an error allocation from an adjacent pixel in the same block in carrying out an error diffusion process on divided blocks.

According to the method using the error buffer, however, data evacuation and data call from the error buffer become a complicated process in handing over the data to the next band. The process described in Japanese Laid-Open Patent Publication No. 2002-237952 is limited to the PDL data rendering, and a unit of process for this method depends on PDL data. This method, therefore, is not applicable to a case where a band size is limited because of execution of an error diffusion process in a time between copy jobs. The process described in Japanese Laid-Open Patent Publication No. 2005-020733, on the other hand, puts a limitation on two-dimensional error allocation, allowing only the error allocation from a single pixel.

SUMMARY OF THE INVENTION

The object of the present invention is to provide an image processing apparatus, an error diffusion processing method by the image processing apparatus, and a program for the error diffusion processing method that repeat an error diffusion process not accompanying quantization on one line near the head line of each band resulting from image data division, and that carry out an error diffusion process sequentially on each band from the head line of each band on the basis of an error value obtained from the repeated error diffusion process to put out quantized data.

Another object of the present invention is to provide an image processing apparatus comprising: a dividing portion that divides input multivalue image data into a plurality of bands; an error diffusion process portion that carries out an error diffusion process on each divided band to quantize each pixel; and a controlling portion that controls the dividing portion and the error diffusion process portion, wherein the error diffusion process portion follows control by the controlling portion to calculate an error value on each noted pixel of the each band without quantizing the noted pixel and diffuse the calculated error value to surrounding pixels around the each noted pixel.

Another object of the present invention is to provide the image processing apparatus, wherein the error diffusion process portion follows control by the controlling portion to operate in a first mode and in a second mode, the error diffusion process portion in the first mode repeating an error diffusion process not accompanying quantization given times on each noted pixel included in a given line of the each band, and the error diffusion process portion in the second mode carrying out an error diffusion process on the each band sequentially from a head line of the each band on the basis of an error value obtained in the first mode to put out quantized data.

Another object of the present invention is to provide an image processing apparatus comprising: a dividing portion that divides input multivalue image data into a plurality of bands; an error diffusion process portion that carries out an error diffusion process on each divided band to quantize each pixel; and a controlling portion that controls the dividing portion and the error diffusion process portion, wherein the error diffusion process portion follows control by the controlling portion to operate in a first mode and in a second mode, the error diffusion process portion in the first mode repeating an error diffusion process not accompanying quantization given times on each noted pixel included in a given line of the each band, and the error diffusion process portion in the second mode carrying out an error diffusion process on the each band sequentially from a head line of the each band on the basis of an error value obtained in the first mode to put out quantized data.

Another object of the present invention is to provide the image processing apparatus, wherein the given line is the head line of the each band or a line near the head line.

Another object of the present invention is to provide the image processing apparatus, wherein the number of surrounding pixels in the first mode is different from the number of surrounding pixels in the second mode.

Another object of the present invention is to provide the image processing apparatus, wherein allocations to surrounding pixels in the first mode are different from allocations to surrounding pixels in the second mode.

Another object of the present invention is to provide the image processing apparatus, comprising an image forming portion, wherein when another image data is processed between pages of an image data for image formation at the image forming portion, the error diffusion process portion follows control by the controlling portion to carry out an error diffusion process page by page on the image data, and to carry out an error diffusion process band by band on the other image data between the pages of the image data.

Another object of the present invention is to provide an error diffusion processing method of diffusing an error to surrounding pixels when input multivalue image data is converted into image data having tones fewer than that of the original input multivalue image data, the error being an error between a tone value of each pixel of the converted image data and a tone value of each pixel of the input multivalue image data, the method comprising the steps of: dividing the input multivalue image data into a plurality of bands; repeating an error diffusion process not accompanying quantization given times on each noted pixel included in a given line of the each divided band; and carrying out an error diffusion process on the each band sequentially from a head line of the each band on the basis of an error value obtained from the repeated error diffusion process to put out quantized data.

Another object of the present invention is to provide a program for executing the error diffusion processing method.

PREFERRED EMBODIMENTS OF THE INVENTION

Preferred embodiments of an image processing apparatus, an error diffusion processing method by the image processing apparatus, and a program for the error diffusion processing method will now be described with reference to the accompanying drawings.

Figure 1:
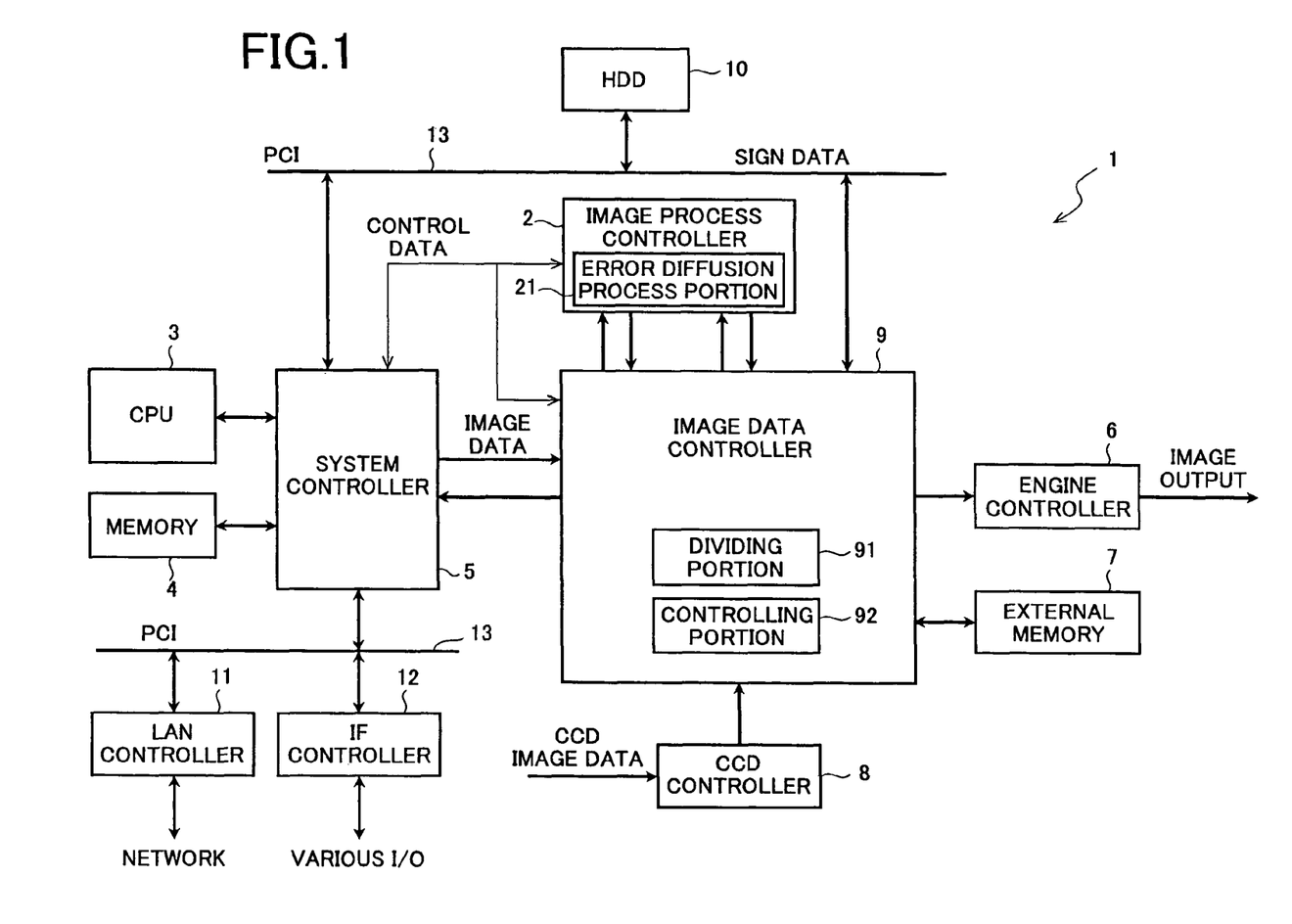
FIG. 1 is a block diagram of an example of the configuration of the principle part of an image processing apparatus according to one embodiment of the present invention.

FIG. 1 is a block diagram of an example of the configuration of the principle part of an image processing apparatus according to one embodiment of the present invention. In FIG. 1, 1 denotes the image processing apparatus. The image processing apparatus 1 includes an image process controller 2, a CPU 3, a memory 4 such as a ROM, RAM, etc., a system controller 5, an engine controller 6, an external memory 7, a CCD (Charge Coupled Device) controller 8, an image data controller 9, an HDD (Hard Disc) 10, a LAN (Local Area Network) controller 11, an IF (Interface) controller 12, and a system (PCI) bus 13.

The image process controller 2 has an error diffusion process portion 21, and executes an error diffusion process when input multivalue image data is converted into image data having tones fewer than that of the original multivalue image data. Through the error diffusion process, an error between the tone (thickness) value of each pixel in the converted image data and the tone (thickness) value of each pixel in the input multivalue image data is diffused into surrounding pixels.

The system controller 5 is connected to the CPU 3 serving as a calculating means that controls the operation of the image processing apparatus 1, and to the memory 4, which is a semiconductor memory, such as ROM and RAM, that stores control programs and data for controlling the operation of the image processing apparatus 1.

The system controller 5 is also connected to the HDD 10 that stores image data, to the LAN controller 11 that provides connection to a network, such as LAN, and to the IF controller 12 that provides connection to various input/output devices, via the PCI bus 13.

The system controller 5 is also connected to the image process controller 2 and the image data controller 9 so that the controllers 5, 2, and 9 can communicate with each other and that the exchange of control data can be performed among them.

The image data controller 9 is connected to the image process controller 2. The image data controller 9 has a dividing portion 91 that divides input multivalue image data into a plurality of bands, and a controlling portion 92 that controls the dividing portion 91 and the error diffusion process portion 21 in the image process controller 2.

The image data controller 9 is also connected to the CCD controller 8. The image data controller 9 inputs image data, which is read optically from a manuscript by a scanner (CCD) (not shown), and sends the image data to the image process controller 2, where the image data is subjected to a given image process by the error diffusion process portion 21, etc. The image data controller 9 then outputs the image data having undergone the image process at the image process controller 2 to any one of the engine controller 6, the HDD 10, and the external memory 7.

The engine controller 6 is equivalent to an image forming portion of the present invention that carries out an image forming process. At the engine controller 6, a laser scanning unit (LSU) (not shown) emits laser light onto the surface of a photosensitive drum, where the laser light forms an electrostatic latent image corresponding to manuscript image data. The electrostatic latent image is visualized using toner. This toner image is transferred to recording paper by a transfer charger, fixed to the paper by heat by a fixing roller, and then ejected onto a given paper ejecting tray.

The external memory 7 is such an external storage medium as USB memory and memory card that can store image data. The external memory 7 is connected removably to the image processing apparatus 1.

The error diffusion process portion 21, which is the main feature of the present invention, follows control by the controlling portion 92 to operate in a first mode and a second mode. In the first mode, the error diffusion process portion 21 repeats an error diffusion process not accompanying quantization given times on each noted pixel included in a given line of each band resulting from division by the dividing portion 91. In the second mode, the error diffusion process portion 21 carries out an error diffusion process sequentially on each band from the head line of each band on the basis of an error value obtained in the first mode to put out quantized data. In the first mode, the given line to be processed is the head line or a line near the head line of each band, and the process executed in the first mode will be described referring to FIG. 2.

Figure 2:
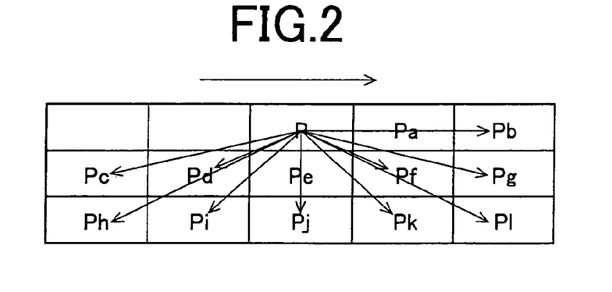
FIG. 2 depicts an example of an error diffusion process table used for an error diffusion process according to the present invention.

FIG. 2 depicts an example of an error diffusion process table used for the error diffusion process according to the present invention. According to this example, the matrix size of the error diffusion process table is 5×3, which defines a range of error scattering as 5×3. When a tone (thickness) value is P, an error value is Err, a threshold is Th, and a diffusion factor is Wi ($\Sigma Wi=1$) at a noted pixel P (x, y) in an original image, the error value Err is defined by the following equations.

$$Err = P - 255 \text{(mathematical sign of Err is negative)} \quad (1)$$

where $P \geq Th$ is satisfied.

$$Err = P - 0 \text{(mathematical sign of Err is positive)} \quad (2)$$

where $P < Th$ is satisfied.

In FIG. 2, the error value Err obtained from the above equations (1) and (2) is added to the original image tone value of each of pixels Pa to Pl (12 pixels) surrounding the noted pixel P to determine new tone values Pa' to Pl'. These new tone values Pa' to Pl' are given by the following equations (3) to (14). When P≧Th is satisfied, the tone value of the noted pixel is converted into 255, which results in an increase in the tone value. When P<Th is satisfied, on the other hand, the tone value of the noted pixel is converted into 0, which results in a decrease in the tone value. To maintain the overall tone value of the image, therefore, the error value is determined to be a negative value when P≧Th is satisfied, and is determined to be a positive value when P<Th is satisfied.

$$Pa'=Pa+Err \times Wa \quad (3)$$

$$Pb'=Pb+Err \times Wb \quad (4)$$

$$Pc'=Pc+Err \times Wc \quad (5)$$

$$Pd'=Pd+Err \times Wd \quad (6)$$

$$Pe'=Pe+Err \times We \quad (7)$$

$$Pf'=Pf+Err \times Wf \quad (8)$$

$$Pg'=Pg+Err \times Wg \quad (9)$$

$$Ph'=Ph+Err \times Wh \quad (10)$$

$$Pi'=Pi+Err \times Wi \quad (11)$$

$$Pj'=Pj+Err \times Wj \quad (12)$$

$$Pk'=Pk+Err \times Wk \quad (13)$$

$$Pl'=Pl+Err \times Wl \quad (14)$$

When the error diffusion process on the noted pixel P is over, the pixel Pa next on the right to the noted pixel P is taken to be a new noted pixel, and is subjected to the same error diffusion process. For the noted pixel Pa, instead of the tone value Pa, the tone value Pa' determined by the above equation (3) is assumed as the original tone value and used for the same process. This series of processes are repeated given times, for example, from the left end to the right end of the head line of a band in the order of raster scanning. Thus, a proper error value can be obtained in the band.

The above process is equivalent to the process of the first mode, which is executed by the error diffusion process portion 21 following control by the controlling portion 92. In the first mode, the error diffusion process without accompanying quantization is repeated given times on each pixel in the head line or a line near the head line to obtain a proper error value. The number of repetition of the error diffusion process required to obtain the proper error value varies according to the number of the surrounding pixels (or diffusion factors) included in a range of error scattering. About 24 times of repetition provide the proper error value.

When the process of the first mode is over, the error diffusion process portion 21 executes the process of the second mode, according to which the error diffusion process portion 21 carries out the conventional error diffusion process (error diffusion process shown in FIGS. 9 to 12) sequentially from the head line of each band on the basis of the error values obtained in the first mode to put out quantized data. Then, the error diffusion process portion 21 ends a series of the error diffusion processes.

The number of the surrounding pixels in the first mode may be smaller than the number of the surrounding pixels in the second mode. For example, the range of scattering may be 3×2 in the first mode and 5×3 in the second mode. This increases an amount of scattering (error value) to the surrounding pixels at one round in the first mode, which allows a reduction in the time of repetition.

Allocations (i.e., diffusion factors) to the surrounding pixels in the first mode may be determined to be larger than allocations to the surrounding pixels in the second mode. In the same manner as described above, this increases an amount of scattering (error value) to the surrounding pixels at one round in the first mode, which allows a reduction in the time of repetition.

When another image data is processed between pages of an image data for image formation at the engine controller 6, for example, when scanner data is divided and is subjected to the error diffusion process using a time between copy jobs processed page by page, the error diffusion process portion 21, following control by the controlling portion 92, may carry out the error diffusion process page by page on the image data for image formation, and carry out the error diffusion process (first mode and second mode) band by band on the other image data, such as scanner data, between pages of the image data for image formation.

Examples of basic circuit configurations for execution of the error diffusion process according to the present invention will then be described referring to FIGS. 3 to 6.

Figure 3:
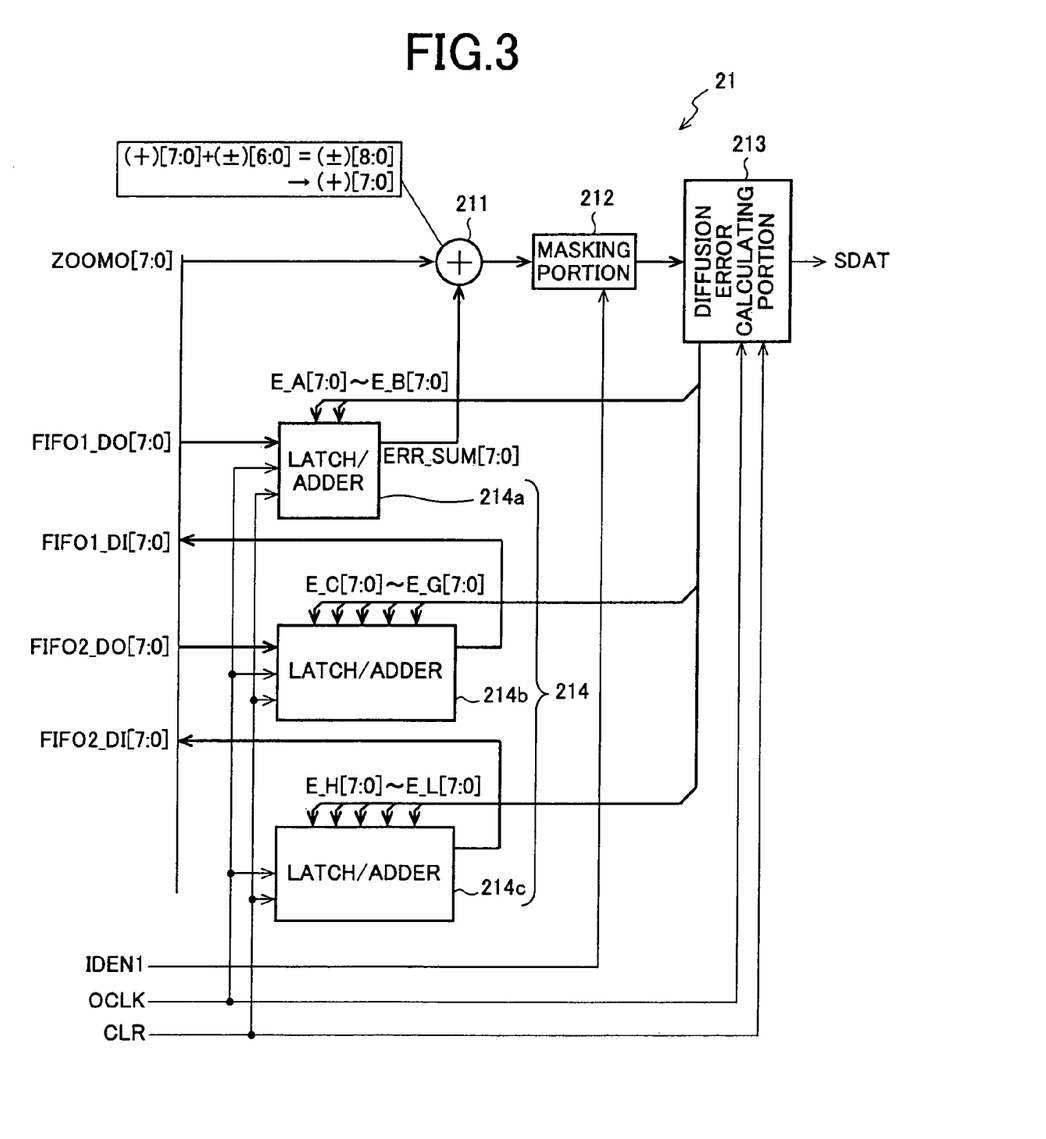
FIG. 3 is a circuit diagram of an example of the detailed configuration of an error diffusion process portion according to the present invention.

FIG. 3 is a circuit diagram of an example of the detailed configuration of the error diffusion process portion 21 according to the present invention. As shown in FIG. 3, the error diffusion process portion 21 includes an adder 211, a masking portion 212, a diffusion error calculating portion 213, and a latch/adder 214. The error diffusion process portion 21 of this example is a circuit that carries out a binarization process using an error diffusion method. In the error diffusion process portion 21, diffusion errors are accumulated for each pixel, to which the diffusion errors are added, by a line memory (FIFO) and a latch circuit, and are added to the original data just before execution of the binarization process.

Signals put into the error diffusion process portion 21 will be described.

ZOOMO[7:0] denotes input data from a prestage process, and is put into the adder 211. IDEN1 denotes an effective input data enabling signal, and is put into the masking portion 212, which masks ineffective data. OCLK denotes a data transfer clock signal, and is put into latch/adders 214a to 214c and into the diffusion error calculating portion 213. CLR denotes an all clear signal, and is put into the latch/adders 214a to 214c and into the diffusion error calculating portion 213, as OCLK is. FIFO1_DO[7:0] denotes output data from a line memory FIFO1, and is put into the latch/adder 214a. FIFO2_DO[7:0] denotes output data from a line memory FIFO2, and is put into the latch/adder 214b.

Signals put out of the error diffusion process portion 21 will then be described.

SDAT denotes a binary serial output signal, and is put out of the diffusion error calculating portion 213. FIFO1_DI[7:0] denotes input data to the line memory FIFO1, and is put out of the latch/adder 214b. FIFO2_DI[7:0] denotes input data to the line memory FIFO2, and is put out of the latch/adder 214c.

Signals inside the error diffusion process portion 21 will then be described.

E_A[7:0] to E_L[7:0] denote diffusion errors of each pixel in the error diffusion process, and are put into the latch/adders 214a to 214c from the diffusion error calculating portion 213. These diffusion errors E_A[7:0] to E_L[7:0] correspond to the pixels Pa to Pl shown in FIG. 2. ERR_SUM[7:0] denotes the sum of diffusion errors (diffusion error sum) in the error diffusion process, and is put out from the latch/adder 214a into the adder 211.

Figure 4:
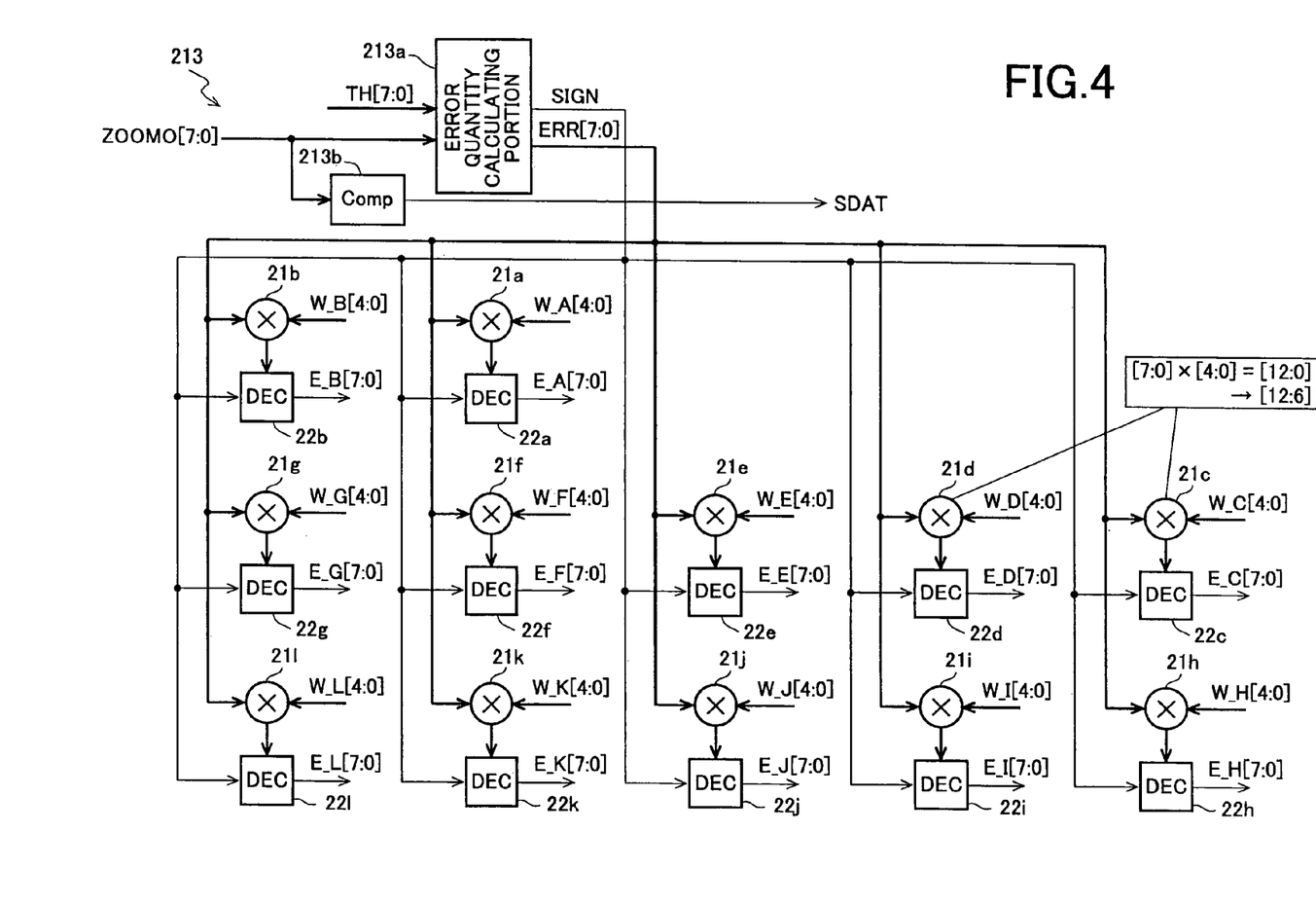
FIG. 4 is a circuit diagram of an example of the detailed configuration of a diffusion error calculating portion shown in FIG. 3.

FIG. 4 is a circuit diagram of an example of the detailed configuration of the diffusion error calculating portion 213 shown in FIG. 3. As shown in FIG. 4, the diffusion error calculating portion 213 includes an error quantity calculating portion 213a, a comparator 213b, multipliers 21a to 21l, and decoders 22a to 22l. The diffusion error calculating portion 213 calculates allocation values based on the error diffusion process table shown in FIG. 10. The diffusion error calculating portion 213 receives input of a diffusion error sum ERR_SUM and a threshold TH for a noted pixel. This diffusion error sum ERR_SUM for the noted pixel is the sum that includes an addition of an allocation value of a pixel having undergone the error diffusion process previous to the noted pixel. The diffusion error sum ERR_SUM and the threshold TH are put into the comparator 213b and into the error quantity calculating portion 213a.

The comparator 213b compares the diffusion error sum ERR_SUM with the threshold TH, which causes conversion of the tone value of the noted pixel into 0 or 255. This conversion process is carried out according to a diffusion error calculating condition shown in FIG. 5. When input data is binarized based on the threshold TH, an error is calculated according to the diffusion error calculating condition shown in FIG. 5, and the calculated error is multiplied by diffusion factors (W_A to W_L) to calculate allocation errors to surrounding 12 pixels. The diffusion factors (W_A to W_L) are, for example, selected as a prearranged set of factors, as shown in FIG. 10.

Figure 5:
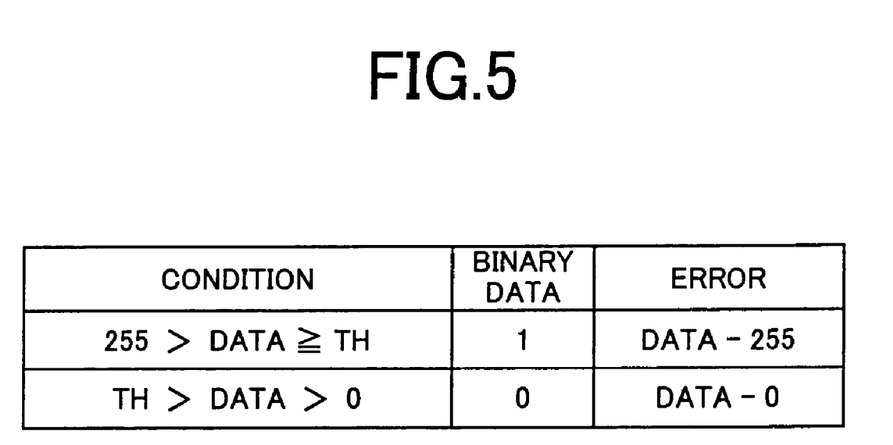
FIG. 5 depicts an example of a diffusion error calculation condition.

When 255>ERR_SUM(DATA)≧TH is satisfied, the tone value of the noted pixel is converted into 255. When TH>ERR_SUM(DATA)>0 is satisfied, the tone value of the noted pixel is converted into 0. Since binary data output is given as 0 or 1, the tone value of 255 is equivalent to 1 in binary data. When ERR_SUM(DATA)≧TH is satisfied, therefore, output from the comparator 213b is SDAT=1, which forms a dot. When TH>ERR_SUM(DATA) is satisfied, on the other hand, output from the comparator 213b is SDAT=0, which does not form a dot.

The error quantity calculating portion 213a calculates the error quantity ERR of the binarized noted pixel. When ERR_SUM≧TH is satisfied, the tone value of the noted pixel is converted into 255, which gives a calculation of the error quantity: ERR=255−ERR_SUM. When TH>ERR_SUM is satisfied, the tone value of the noted pixel is converted into 0, which gives a calculation of the error quantity: ERR=ERR_SUM−0. The error value (quantity) ERR calculated in this manner is sent to the multipliers 21a to 21l. At the same time, the diffusion factors W_A to W_L, which correspond to the error diffusion process table, are given to the multipliers 21a to 21l, where the product of the error value ERR and each of the diffusion factors W_A to W_L is calculated.

The products of the error value ERR and diffusion factors W_A to W_L represent the size of a diffusion error, and are put into the decoders 22a to 22l connected to the multipliers 21a to 21l, respectively. The error value ERR is calculated at a value more than 0 in both cases of ERR_SUM≧=TH and TH>ERR_SUM. In the case of ERR_SUM≧TH, the tone value of the noted pixel is converted into 255 to increase the tone value of the pixel. In the case of TH>ERR_SUM, conversely, the tone value of the noted pixel is decreased.

To maintain the overall thickness of the image, therefore, diffusion errors must be negative values in the case of ERR_SUM≧TH, and therefore the error quantity calculating portion 213a sends a sign signal SIGN=0 to each of the decoders 22a to 22l. The signal SIGN=0 indicates that the mathematical sign of the diffusion error is negative, so that the decoders 22a to 22l set the mathematical sign of the products of the error value ERR and the diffusion factors W_A to W_L to be negative, and put out the diffusion errors E_A to E_L.

In the case of TH>ERR_SUM, the error quantity calculating portion 213a sends a sign signal SIGN=1 to each of the decoders 22a to 22l. The signal SIGN=1 indicates that the mathematical sign of the diffusion error is positive, so that the decoders 22a to 22l set the mathematical sign of the products of the error value ERR and the diffusion factors W_A to W_L to be positive, and put out the diffusion errors E_A to E_L, which are arranged relative to the noted pixel in correspondence to the matrix (Pa to Pl) shown in FIG. 2.

The diffusion errors determined in the above manner are scattered to the surrounding pixels around the noted pixel, which causes a variation in the diffusion error sum ERR_SUM of the noted pixel that is shifted in sequence. A calculating circuit for calculating the diffusion error sum ERR_SUM of the noted pixel is shown in FIG. 6.

Figure 6:
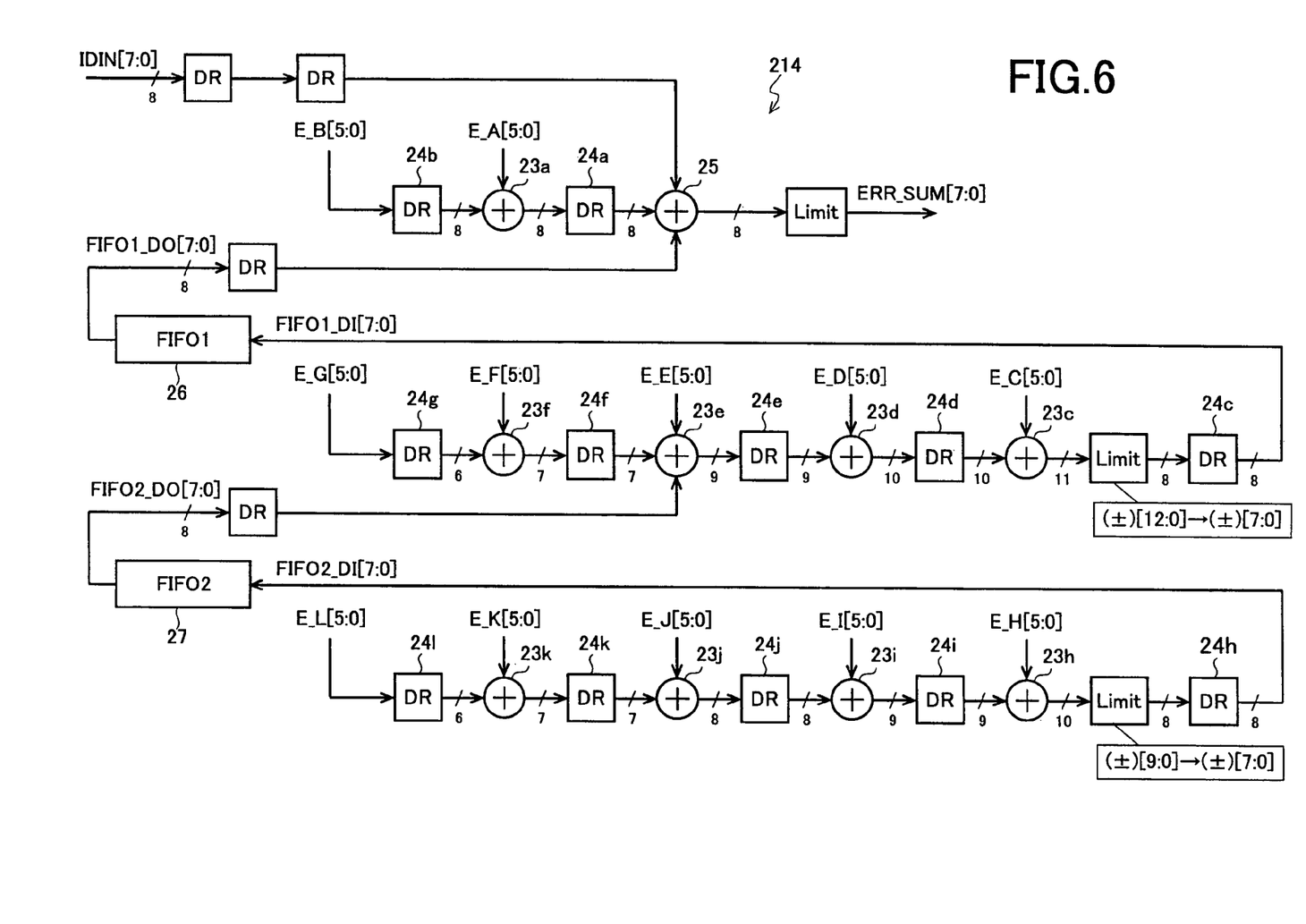
FIG. 6 is a circuit diagram of an example of the detailed configuration of a latch/adder shown in FIG. 3.

FIG. 6 is a circuit diagram of an example of the detailed configuration of the latch/adder 214 shown in FIG. 3. As shown in FIG. 6, the latch/adder 214 includes adders 23a, 23c, 23d, 23e, 23f, 23h, 23i, 23j, 23k, and 25, data registers 24a to 24l, and line memories (FIFO) 26 and 27. The latch/adder 214 of this example allocates an error of a pixel, which is to be binarized, to surrounding 10 pixels upon error diffusion. In a reverse point of view, however, the latch/adder 214 receives diffusion errors from the surrounding 10 pixels. The latch/adder 214 thus has latch circuits and adders for accumulating the diffused errors from the surrounding pixels.

Signals put into the latch/adder 214 will be described.

E_A to E_L[5:0] denote diffusion errors input from the diffusion error calculating portion 213, and the diffusion errors are put into corresponding adders. FIFO1_DO[7:0] denotes output data from the line memory 26 (FIFO1), and is put into the adder 25. FIFO2_DO[7:0] denotes output data from the line memory 27 (FIFO2), and is put into the adder 23e.

Signals put out of the latch/adder 214 will then be described.

ERR_SUM[7:0] denotes a value of the result of accumulation of the diffusion errors, and is put out to the adder 211 shown in FIG. 3 and added to input data before binarization. FIFO_DI[7:0] denotes input data to the line memory 26 (FIFO1), and is put out of the data register 24c. FIFO2_DI[7:0] denotes input data to the line memory 27 (FIFO2), and is put out of the data register 24h.

In FIG. 6, the diffusion error calculating portion 213 shown in FIG. 4 calculates diffusion errors E_A to E_L on the first noted pixel (pixel at the upper left corner of the original image). The calculated diffusion errors E_A to E_L are stored in an error diffusion block having the same matrix size as the error diffusion process table shown in FIG. 10 (5 rows×3 lines). The error diffusion block carries out the accumulation/summation of diffusion errors and stores a summation result (accumulation result).

In FIG. 6, the diffusion errors E_A, E_C, E_D, E_E, E_F, E_H, E_I, E_J, and E_K calculated by the diffusion error calculating portion 213 are stored in the data registers 24a, 24c, 24d, 24e, 24f, 24h, 24i, 24j, and 24k via the adders 23a, 23c, 23d, 23e, 23f, 23h, 23i, 23j, and 23k, respectively. The diffusion errors E_B, E_G, and E_L are directly stored in the registers 24b, 24g, and 24l, respectively, without involving the adders.

When the noted pixel is shifted to the second noted pixel to calculate diffusion errors, the diffusion error block (not shown) is also shifted by one line as the noted pixel is shifted. In the shifted diffusion error block, diffusion errors calculated on the second noted pixel are added as described above.

In FIG. 6, the shift of the diffusion error block by one line means that data stored in the diffusion error block shifts by one line in reverse to the direction of the shift of the diffusion error block. For example, the shift of the diffusion error block by one line causes the diffusion error E_B on the first noted pixel to shift in position from the data register 24b to the data register 24a.

At this time, E_A to E_L on the second noted pixel are stored in the diffusion error block. As a result, the added value of the diffusion error E_B on the first noted pixel and the diffusion error E_A on the second noted pixel is stored at the position of the data register 24a. For example, data stored in the data register 24b (diffusion error E_B on the first noted pixel) and the diffusion error E_A on the second noted pixel are put into the adder 23a, from which the added value of the diffusion errors E_B and E_A is sent to the data register 24a.

The data stored in the data register 24a is added to the initial tone value IDIN of the noted pixel in the original image at the adder 25, from which the added value of the data and the initial tone value IDIN is put out as ERR_SUM. The output ERR_SUM is compared with the threshold TH at the comparator 213b of the diffusion error calculating portion 213, and is binarized.

The data forced out of the diffusion error block as a result of a shift of the diffusion error block are sent to the line memory (FIFO) to be stored there. This means that the diffusion errors E_C and E_H in the first row of the diffusion error block are stored in the line memories 26 and 27, respectively. Specifically, data in the data register 24h is sent to the line memory 27, and data in the data register 24c is sent to the line memory 26. When the number of rows in the original image is n and that in the diffusion error block is m, the number of data that can be stored in line memories 26 and 27 is determined to be n−m.

For the third noted pixel and other noted pixels to follow, the shift in data stored in each data register and the addition of diffusion errors calculated on the noted pixel are carried out in the same manner as described above, thus data are stored in the diffusion error block and in the line memories 26 and 27. Ultimately, the error diffusion process is carried out on every pixel of the original image.

Figure 7:
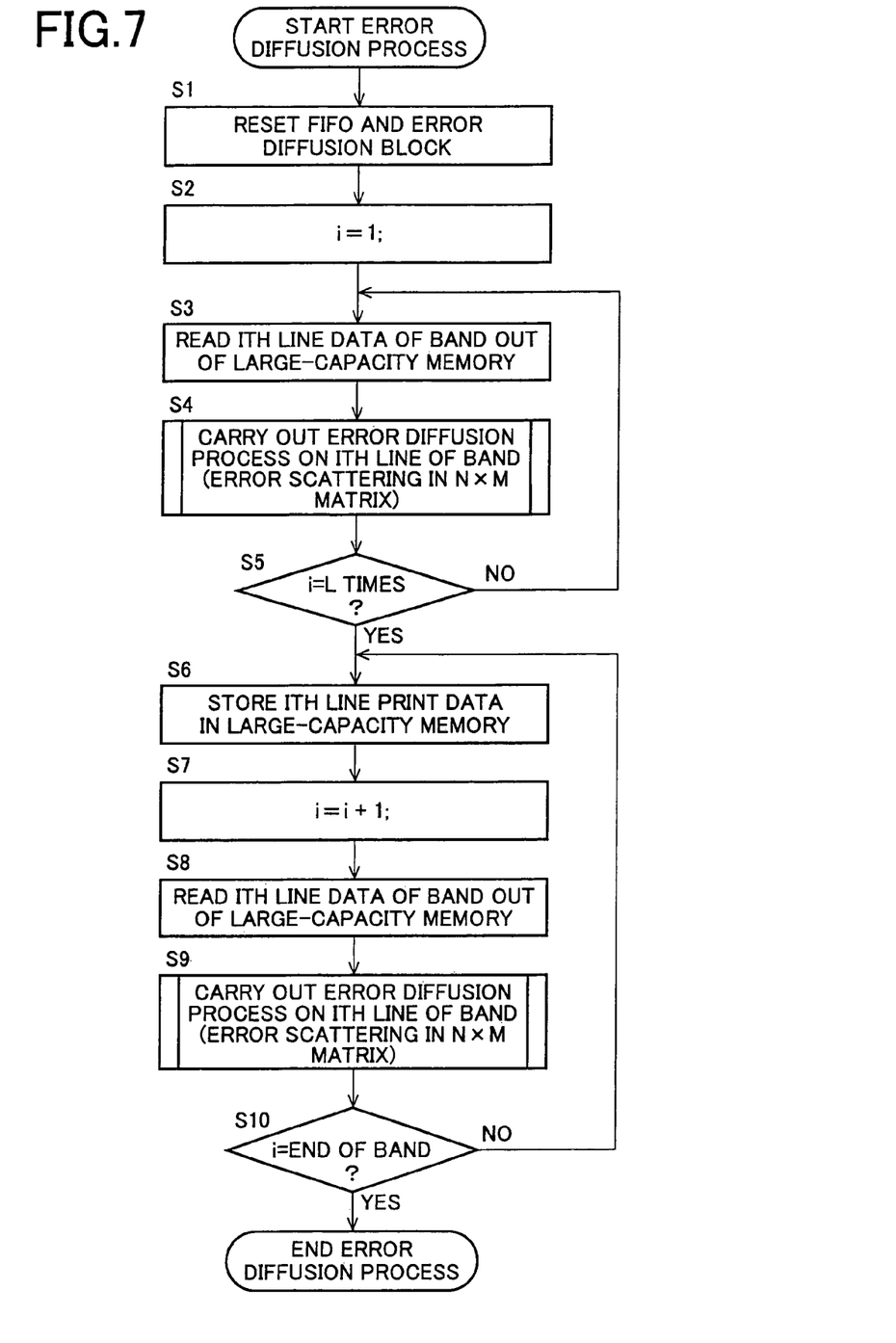
FIG. 7 is an explanatory flowchart of an example of an error diffusion processing method according to the present invention.

FIG. 7 is an explanatory flowchart of an example of an error diffusion processing method according to the present invention. The image processing apparatus 1 first resets the FIFO (line memories) and the diffusion error block, in which error values are set (step S1), and sets a line number i=1 (step S2). The image processing apparatus 1 then reads ith line data of a band out of a large-capacity memory (step S3), and carries out an error diffusion process (error scattering in N×M matrix) on the ith line of the band (step S4).

The image processing apparatus 1 then determines on whether the time of repetition of the error diffusion process on the ith line has reached given times (L times) for obtaining a proper error value (step S5). When the time of repetition has reached L times (Yes at step S5), the image processing apparatus 1 stores the ith line print data in the large-capacity memory (step S6). When the time of repetition has not reached L times (No at step S5), the image processing apparatus 1 proceeds to step S3 to repeat the same flow of processes.

Subsequently, the image processing apparatus 1 sets a line number i=i+1 (step S7), reads ith line data of the band out of the large-capacity memory (step S8), and carries out an error diffusion process (error scattering in N×M matrix) on the ith line of the band (step S9).

Finally, the image processing apparatus 1 determines on whether the ith line is the end of the band (step S10). When the ith line is the end of the band (Yes at step S10), the image processing apparatus 1 ends the flow of processes. When the ith line is not the end of the band (No at step S10), the image processing apparatus 1 returns to step S6 to repeat the same flow of processes.

Through the above flow of processes, it is possible to repeat the error diffusion process not accompanying quantization the given times on each noted pixel included in a given line of each band, and carry out the error diffusion process sequentially on each band from the head line of each band on the basis of an error value obtained from the repeated error diffusion process to put out quantized data. "L" at step S5 represents the time of repetition for achieving the proper error value. This time of repetition varies depending on what diffusion factors are used. About 24 times of repetition provides the proper error value.

Figure 8:
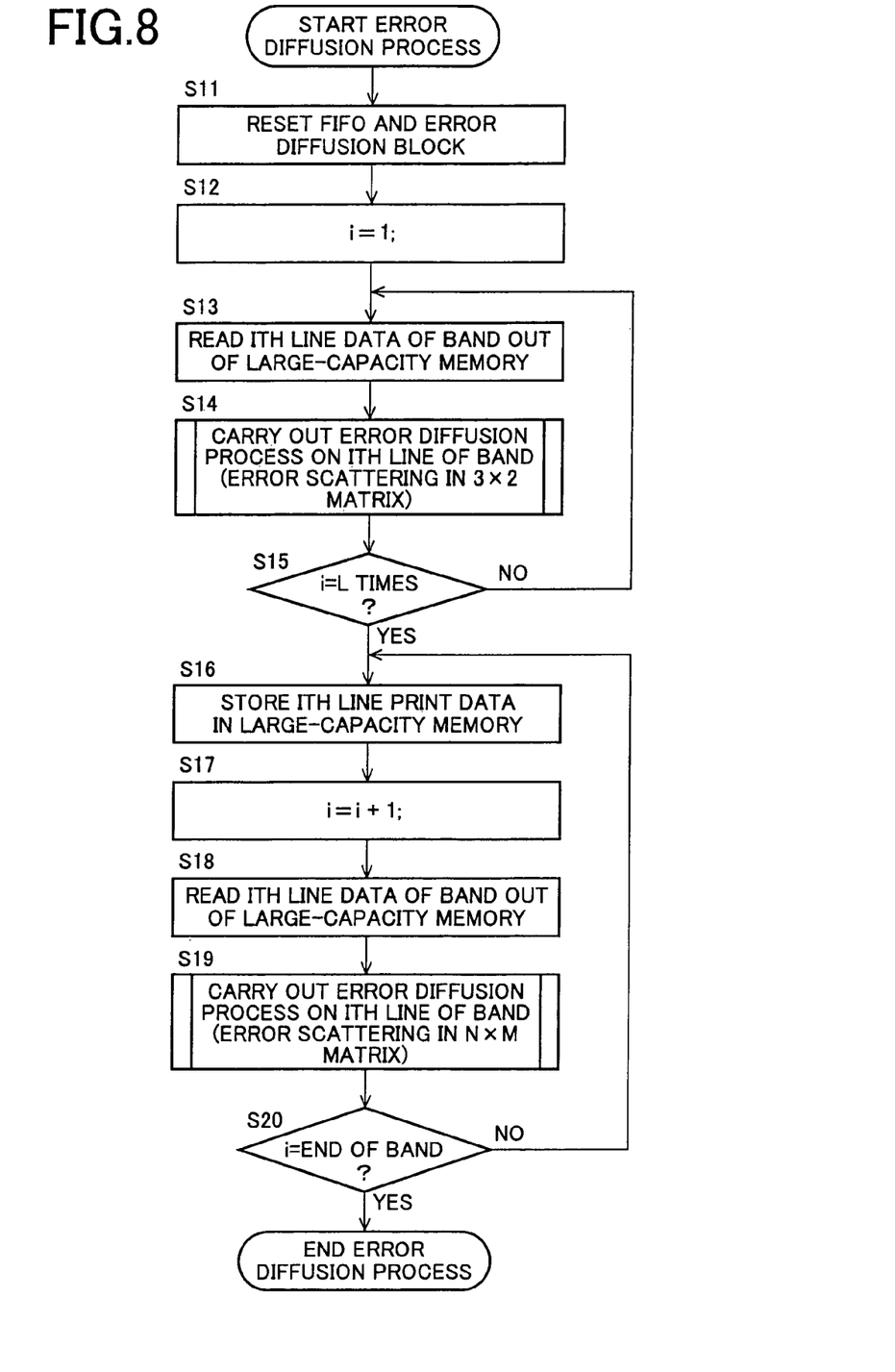
FIG. 8 is an explanatory flowchart of another example of the error diffusion processing method according to the present invention.

FIG. 8 is an explanatory flowchart of another example of the error diffusion processing method according to the present invention. The image processing apparatus 1 first resets the FIFO (line memories) and the diffusion error block, in which error values are set (step S11), and sets a line number i=1 (step S12). The image processing apparatus 1 then reads ith line data of a band out of the large-capacity memory (step S13), and carries out an error diffusion process (error scattering in n×m (<N×M) matrix) on the ith line of the band (step S14). In this case, for example, when N×M is 5×3, n×m is 3×2.

The image processing apparatus 1 then determines on whether the time of repetition of the error diffusion process on the ith line has reached given times (L times) for obtaining a proper error value (step S15). When the time of repetition has reached L times (Yes at step S15), the image processing apparatus 1 stores the ith line print data in the large-capacity memory (step S16). When the time of repetition has not reached L times (No at step S15), the image processing apparatus 1 proceeds to step S13 to repeat the same flow of processes.

Subsequently, the image processing apparatus 1 sets a line number i=i+1 (step S17), reads ith line data of the band out of the large-capacity memory (step S18), and carries out an error diffusion process (error scattering in N×M matrix) on the ith line of the band (step S19).

Finally, the image processing apparatus 1 determines on whether the ith line is the end of the band (step S20). When the ith line is the end of the band (Yes at step S20), the image processing apparatus 1 ends the flow of processes. When the ith line is not the end of the band (No at step S20), the image processing apparatus 1 returns to step S16 to repeat the same flow of processes.

Through the above flow of processes, it is possible to repeat the error diffusion process not accompanying quantization the given times on each noted pixel included in a given line of each band, and carry out the error diffusion process sequentially on each band from the head line of each band on the basis of an error value obtained from the repeated error diffusion process to put out quantized data. In this example, the error scattering is carried out in n×m matrix (e.g., 3×2) until the proper error value has been achieved, although the error scattering in N×M matrix (e.g., 5×3) is carried out after the achievement of the proper error value. Because of this, the time of repetition "L" becomes smaller than the time of repetition "L" required in the example shown in FIG. 7.

Embodiments of the present invention have been described centering on various functions of the image processing apparatus according to the present invention. The present invention is provided also in the form of the error diffusion processing method, as described above as the method for the image processing apparatus to execute each step. The invention can be provided also in the form of a program for causing a computer to execute the error diffusion processing method, and in the form of a recording medium recording the program.

An embodiment of the recording medium storing a program and data for executing each step of the present invention will be described. Specifically, the recording medium can be provided as a CD-ROM (-R/-RW), optical magnetic disc, DVD-ROM (-R/-RW/-RAM), FD, HD, BD, flash memory, memory card, a memory stick, various kinds of ROMs and RAMs, etc. The recording medium records the program for causing the computer to execute the error diffusion processing method according to the embodiments of the present invention for execution of each step of the invention. The recording medium recording the program is distributed to facilitate execution of the above steps. Each step of the present invention can be executed by attaching the recording medium to an information processing apparatus, such as computer, and causing the information processing apparatus to read the program from the recording medium, or by storing the program in a storage medium incorporated in the information processing apparatus and causing the information processing apparatus to read out the program on a necessary basis.

As described heretofore, according to the present invention, the error diffusion process not accompanying quantization is repeated on one line near the head line of each band resulting from image data division, and the error diffusion process is carried out sequentially on each band from the head line of each band on the basis of an error value obtained from the repeated error diffusion process to put out quantized data. This enables the suppression of emergence of an unnatural boundary line between bands using a simple circuit configuration without evacuating an error value band by band to another memory.

The invention claimed is:

1. An image processing apparatus comprising:
a dividing portion that divides input multivalue image data into a plurality of bands;
an error diffusion process portion that carries out an error diffusion process on each divided band; and
a controlling portion that controls the dividing portion and the error diffusion process portion,
wherein the error diffusion process portion follows control by the controlling portion to operate in a first mode and in a second mode, the error diffusion process portion in the first mode repeating an error diffusion process given times on each pixel included in only a given line of the each band without adding an error value to pixels in other lines of the each band, and the error diffusion process portion in the second mode carrying out an error diffusion process on the each band sequentially from a head line of the each band on the basis of the error value obtained in the first mode, and
a number of surrounding pixels used in the first mode is smaller than a number of the surrounding pixels used in the second mode.

2. The image processing apparatus of claim 1, wherein the given line is the head line of the each band or a line near the head line.

3. The image processing apparatus of claim 1, wherein allocations to the pixels in the first mode are different from allocations to the pixels in the second mode.

4. The image processing apparatus of claim 1, comprising an image forming portion, wherein when another image data is processed between pages of an image data for image formation at the image forming portion, the error diffusion process portion follows control by the controlling portion to carry out an error diffusion process page by page on the image data, and to carry out an error diffusion process band by band on the other image data between the pages of the image data.

5. An error diffusion processing method carried out in an image processing apparatus of diffusing an error to surrounding pixels when input multivalue image data is converted into image data having tones fewer than that of the original input multivalue image data, the error being an error between a tone value of each pixel of the converted image data and a tone value of each pixel of the input multivalue image data, the method comprising the steps of:
dividing the input multivalue image data into a plurality of bands by a dividing portion of the image processing apparatus;
repeating an error diffusion process given times on each pixel included only in a given line of the each divided band by an error diffusion process portion of the image processing apparatus without adding an error value to pixels in other lines of the each band; and
carrying out by a controlling portion of the image processing apparatus an error diffusion process on the each band sequentially from a head line of the each band on the basis of the error value obtained from the repeated error diffusion process,
wherein a number of the surrounding pixels used in the repeating step is smaller than a number of the surrounding pixels used in the carrying out step.

6. A program embodied in a non-transitory computer-readable medium for executing the error diffusion processing method of claim 5.